US006961472B1

(12) United States Patent
Acharya et al.

(10) Patent No.: US 6,961,472 B1
(45) Date of Patent: Nov. 1, 2005

(54) METHOD OF INVERSE QUANTIZED SIGNAL SAMPLES OF AN IMAGE DURING IMAGE DECOMPRESSION

(75) Inventors: Tinku Acharya, Tempe, AZ (US); Ping-Sing Tsai, Gilbert, AZ (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/507,213

(22) Filed: Feb. 18, 2000

(51) Int. Cl.$^7$ .............................................. G06K 9/46
(52) U.S. Cl. ....................... 382/240; 382/233; 382/236; 382/238
(58) Field of Search ................................ 382/240, 250, 382/239, 238, 236, 248, 251, 232, 233; 708/407; 348/400.1, 390.1; 375/240.1, 240.05, 240.19, 375/240.08

(56) References Cited

U.S. PATENT DOCUMENTS

| | | | | |
|---|---|---|---|---|
| 5,497,435 A | * | 3/1996 | Berger | 382/249 |
| 5,534,927 A | * | 7/1996 | Shishikui et al. | 348/400.1 |
| 5,604,494 A | * | 2/1997 | Murakami et al. | 341/50 |
| 5,610,657 A | * | 3/1997 | Zhang | 348/415 |
| 5,764,805 A | * | 6/1998 | Martucci et al. | 382/238 |
| 5,812,195 A | * | 9/1998 | Zhang | 348/415 |
| 5,841,473 A | * | 11/1998 | Chui et al. | 348/390 |
| 5,848,193 A | * | 12/1998 | Garcia | 382/232 |
| 5,875,122 A | | 2/1999 | Acharya | 708/407 |
| 5,995,210 A | | 11/1999 | Acharya | 356/73 |
| 6,005,625 A | * | 12/1999 | Yokoyama | 375/240.16 |
| 6,009,201 A | | 12/1999 | Acharya | 382/232 |
| 6,009,206 A | | 12/1999 | Acharya | 382/251 |
| 6,047,303 A | | 4/2000 | Acharya | 708/407 |
| 6,091,851 A | | 7/2000 | Acharya | 382/167 |
| 6,094,508 A | | 7/2000 | Acharya et al. | 382/199 |
| 6,108,453 A | | 8/2000 | Acharya | 382/254 |
| 6,124,811 A | | 9/2000 | Acharya et al. | 34/63 |
| 6,130,960 A | | 10/2000 | Acharya | 382/167 |
| 6,151,069 A | | 11/2000 | Dunton et al. | 348/220 |
| 6,151,415 A | | 11/2000 | Acharya et al. | 382/255 |
| 6,154,493 A | * | 11/2000 | Acharya et al. | 375/240.19 |
| 6,166,664 A | | 12/2000 | Acharya | 341/63 |
| 6,178,269 B1 | | 1/2001 | Acharya | 382/277 |
| 6,195,026 B1 | | 2/2001 | Acharya | 341/60 |
| 6,215,908 B1 | | 4/2001 | Pazmino et al. | 382/240 |
| 6,215,916 B1 | | 4/2001 | Acharya | 382/298 |
| 6,229,578 B1 | | 5/2001 | Acharya et al. | 348/607 |
| 6,233,358 B1 | | 5/2001 | Acharya | 382/248 |
| 6,236,433 B1 | | 5/2001 | Acharya et al. | 348/273 |
| 6,236,765 B1 | | 5/2001 | Acharya | 382/276 |

(Continued)

OTHER PUBLICATIONS

Memon et al., "Improved Techniques for Lossless Image Compression with Reversible Integer Wavelet Transforms", IEEE, Oct. 1998, vol. 3, pp. 891-895.*

(Continued)

Primary Examiner—Anh Hong Do
(74) Attorney, Agent, or Firm—Sharon Wong

(57) ABSTRACT

Briefly, in accordance with one embodiment of the invention, a method of inverse quantizing quantized signal samples of an image during image decompression includes the following. A process to transform the signal samples from a first domain to a second domain is applied. During the transform process, signal samples are filter, by first applying scaled filter coefficients to signal samples along the image in a first direction and then applying scaled filter coefficients to signal samples along the image in a second direction, so that at the completion of the transform process of the image, at least a selected portion of the transformed signal samples are inverse quantized. Many other embodiments in accordance with the invention are also described.

31 Claims, 6 Drawing Sheets

U.S. PATENT DOCUMENTS

| | | | | |
|---|---|---|---|---|
| 6,269,181 | B1 | 7/2001 | Acharya | 382/162 |
| 6,275,206 | B1 | 8/2001 | Tsai et al. | 345/88 |
| 6,285,796 | B1 | 9/2001 | Acharya et al. | 382/246 |
| 6,292,114 | B1 | 9/2001 | Tsai et al. | 341/67 |
| 6,301,392 | B1 | 10/2001 | Acharya | 382/239 |
| 6,332,030 | B1 * | 12/2001 | Manjunath et al. | 382/100 |
| 6,348,929 | B1 | 2/2002 | Acharya et al. | 345/660 |
| 6,351,555 | B1 | 2/2002 | Acharya et al. | 382/162 |
| 6,356,276 | B1 | 3/2002 | Acharya | 345/600 |
| 6,366,692 | B1 | 4/2002 | Acharya | 382/162 |
| 6,366,694 | B1 | 4/2002 | Acharya | 382/167 |
| 6,373,481 | B1 | 4/2002 | Tan et al. | 345/342 |
| 6,377,280 | B1 | 4/2002 | Acharya et al. | 345/667 |
| 6,381,357 | B1 | 4/2002 | Tan et al. | 382/141 |
| 6,389,074 | B1 * | 5/2002 | Andrew | 375/240.05 |
| 6,392,699 | B1 | 5/2002 | Acharya | 248/273 |
| 6,560,369 | B1 * | 5/2003 | Sato | 382/239 |

OTHER PUBLICATIONS

Acharya, "A Memory Based VLSI Architecture for Image Compression", U.S. Appl. No. 08/885,415, filed Jun. 30, 1997, 37 Pgs.

Bawolek, et al., "Infrared Correction System", U.S. Appl. No. 09/126,203, filed Jul. 30, 1998, 23 Pgs.

Pazmino, et al., "Method Of Compressing and/or Decompressing a Data Set Using Significance Mapping", U.S. Appl. No. 09/151,336, filed Sep. 11, 1998, 26 Pgs.

Tan, et al., "Robust Sequential Approach in Detecting Defective Pixels Within an Image Sensor", U.S. Appl. No. 09/191,310, filed Nov. 13, 1998, 35 Pgs.

Acharya, et al., "Color Interpolation for a Four Color Mosaic Pattern", U.S. Appl. No. 09/199,836, filed Nov. 24, 1998, 26 Pgs.

Acharya, "A Mathematical Model for Gray Scale and Contrast Enhancement of a Digital Image", U.S. Appl No. 09/207,753, filed Dec. 8, 1998, 28 Pgs.

Acharya, "Enhancing Image Compression Performance by Morphological Processing", U.S. Appl. No. 09/291,810, filed Apr. 14, 1999, 31 Pgs.

Tan, et al., "Using an Electronic Camera to Build a File Containing Text", U.S. Appl. No. 09/301,753, filed Apr. 29, 1999, 21 Pgs.

Tsai, et al., "Method and Apparatus for Adaptively Sharpening an Image", U.S. Appl. No. 09/320,192, filed May 26, 1999, 27 Pgs.

Tan, et al., "Method and Apparatus for Adapively Sharpening Local Image Content of an Image", U.S. Appl. No. 09/328,935, filed Jun. 9, 1999, 29 Pgs.

Tan, et al., "A Methodology for Color Correction With Regulation", U.S. Appl. No. 09/359,831, filed Jul. 23, 1999, 30 Pgs.

Acharya, et al., "Image Processing Method and Apparatus", U.S. Appl. No. 09/359,523, filed Jul. 23, 1999, 16 Pgs.

Acharya, et al., "Zerotree Encoding of Wavelet Data", U.S. Appl. No. 09/390,255, filed Sep. 3, 1999, 22 Pgs.

Acharya, et al., "A Fuzzy Based Thresholding Technique for Image Segmentation", U.S. Appl. No. 09/393,136, filed Sep. 10, 1999, 28 Pgs.

Acharya, et al., "A Fuzzy Didtinction Based Thresholding Technique for Image Segmentation", U.S. Appl. No. 09/393,017, filed Sep. 10, 1999, 29 Pgs.

Acharya, "Video Motion Estimation", U.S. Appl. No. 09/406,032, filed Sep. 27, 1999, 24 Pgs.

Acharya, et al., "Method of Interpolating Color Pixel Signals From a Subsampled Color Image", U.S. Appl. No. 09/410,800, filed Oct. 1, 1999, 20 Pgs.

Acharya, et al., "Method of Compressing a Color Image", U.S. Appl. No. 09/411,697, filed Oct. 1, 1999, 26 Pgs.

Acharya, et al., "Square Root Raised Cosine Symmetric Filter for Mobile Telecommunications", U.S. Appl. No. 09/429,058, filed Oct. 29, 1999 36 Pgs.

Acharya, et al., "Indexing Wavelet Compressed Video for Efficient Data Handling", U.S. Appl. No. 09/438,091, filed Nov. 10, 1999, 29 Pgs.

Acharya, "Method of Upscaling a Color Image", U.S. Appl. No. 09/461,080, filed Dec. 14, 1999, 26 Pgs.

Acharya, "Method of Converting a Sub-Sampled Color Image" U.S. Appl. No. 09/461,068, filed Dec. 14, 1999, 22 Pgs.

Acharya, et al., "Chip Rate Selectable Square Root Raised Cosine Filter for Mobile Telecommunications", U.S. Appl. No. 09/467,487, filed Dec. 20, 1999, 45 Pgs.

Miao, et al., "Dual Mode Filter for Mobile Telecommunications", U.S. Appl. No. 09/467,611, filed Dec. 20, 1999, 48 Pgs.

Metz, et al., "Image Processing Architecture", U.S. Appl. No. 09/473,643, filed Dec. 28, 1999, 16 Pgs.

Acharya, et al., "Method of Quantizing Signal Samples of an Image During Image Compression", U.S. Appl. No. 09/507,399, filed Feb. 18, 2000, 24 Pgs.

U.S. Appl. No. 08/963,335, filed Nov. 3, 1997, Goldstein et al.

U.S. Appl. No. 08/885,415, filed Jun. 30, 1997, Acharya.

U.S. Appl. No 09/008,131, filed Jan. 16, 1998, Acharya et al.

U.S. Appl. No. 09/018,601, filed Feb. 4, 1998, Acharya.

U.S. Appl. No. 09/034,625, filed Mar. 4, 1998, Acharya.

U.S. Appl. No. 09/163,022, filed Sep. 29, 1998, Acharya et al.

U.S. Appl. No. 09/482,551, filed Jan. 13, 2000, Acharya et al.

U.S. Appl. No. 08/963,525, filed Nov. 3, 1997 Acharya.

U.S. Appl. No. 09/114,720, filed Jul. 13, 1998 Acharya.

U.S. Appl. No. 09/050,743, filed Mar. 30, 1998, Acharya.

U.S. Appl. No. 08/963,097, filed Nov. 3, 1997, Booth, Jr., et al.

U.S. Appl. No. 08/986,761, filed Dec. 8, 1997 Acharva et al.

U.S. Appl. No. 09/406,032, filed Sep. 27, 1999, Acharya.

U.S. Appl. No. 09/411,697, filed Dec. 1, 1999, Acharya et al.

U.S. Appl. No. 09/461,080, filed Dec. 14, 1999, Acharya.

U.S. Appl. No. 09/429,058, filed Oct. 29, 1999 Acharya et al.

U.S. Appl. No. 09/467,487, filed Dec. 20, 1999 Acharya et al.

U.S. Appl. No. 09/473,643, filed Dec. 28, 1999 Acharya et al.

U.S. Appl. No. 09/154,176, filed Sep. 6, 1998, Acharya.

U.S. Appl. No. 08/963,334, filed Nov. 3, 1997, Acharya.

U.S. Appl. No. 08/986,461, filed Dec. 8, 1997, Acharya et al.

U.S. Appl. No. 09/258,636, filed Feb. 26, 1999 Acharya et al.

U.S. Appl. No. 09/048,901, filed Mar. 26, 1998 Acharya.

U.S. Appl. No. 09/040,806, filed Mar. 18, 1998 Acharya.

U.S. Appl. No. 09/301,753, filed Apr. 29, 1999, Acharya et al.

U.S. Appl. No. 09/083,383, filed May 21, 1998 Acharya et al.

U.S. Appl. No. 09/109,475, filed Jul. 2, 1998 Acharya et al.
U.S. Appl. No. 09/140,517, filed Aug. 26, 1998 Acharya.
U.S. Appl. No. 09/129,728, filed Aug. 5, 1998 Acharya.
U.S. Appl. No. 09/146,159, filed Sep. 9, 1998 Acharya.
U.S. Appl. No. 09/152,703, filed Sep. 14, 1998 Acharya.
U.S. Appl. No. 09/126,203, filed Jul. 30, 1998 Bawolek et al.
U.S. Appl. No. 09/258,118, filed Feb. 24, 1999 Vavro et al.
U.S. Appl. No. 09/207,753, filed Dec. 8, 1998 Acharya.
U.S. Appl. No. 09/272,751, filed Mar. 3, 1999 Acharya et al.
U.S. Appl. No. 09/165,511, filed Oct. 2, 1998 Acharya et al.
U.S. Appl. No. 09/199,836, filed Nov. 24, 1998 Bawolek et al.
U.S. Appl. No. 09/320,192, filed May 26, 1999 Acharya et al.
U.S. Appl. No. 09/211,309, filed Dec. 14, 1998, Acharya et al.
U.S. Appl. No. 09/438,091, filed Nov. 10, 1999 Achraya et al.
U.S. Appl. No. 09/342,863, filed Jun. 29. 1999, Acharya et al.
U.S. Appl. No. 09/191,310, filed Nov. 13, 1998 Acharya et al.
U.S. Appl. No. 09/383,117, filed Aug. 25, 1999 Acharya et al.
U.S. Appl. No. 09/291,810, filed Apr. 14, 1999 Acharya
U.S. Appl. No. 09/292,763, filed Apr. 14, 1999 Acharya et al.
U.S. Appl. No. 09/390,255, filed Sep. 3, 1999 Acharya et al.
U.S. Appl. No. 09/329,632, filed Jun. 10, 1999 Acharya et al.
U.S. Appl. No. 09/328,935, filed Jun. 9, 1999 Acharya et al.
U.S. Appl. No. 09/359,831, filed Jul. 23, 1999 Acharya et al.

* cited by examiner

Row-Wise $$\frac{1}{\sqrt{Q\_LL}}\qquad \frac{\sqrt{Q\_LL}}{Q\_HL}$$

Col-Wise $$\frac{1}{\sqrt{Q\_LL}}$$

$$\frac{\sqrt{Q\_LL}}{Q\_LH}\qquad \frac{Q\_HL}{Q\_HH\sqrt{Q\_LL}}$$

Set Q_LL equal to 1 when is not at the top level K

Figure 2

Row-Wise                Col-Wise

Set Q_LL equal to 1 when is not at the top level K

US 6,961,472 B1

METHOD OF INVERSE QUANTIZED SIGNAL SAMPLES OF AN IMAGE DURING IMAGE DECOMPRESSION

RELATED APPLICATION

This patent application is related to concurrently filed U.S. patent application Ser. No. 09/507,399, titled "Method of Quantizing Signal Samples of an Image During Image Compression," by Acharya et al., assigned to the assignee of the current invention and herein incorporated by reference.

BACKGROUND

This disclosure relates to image compression and decompression and, more particularly, to inverse quantizing quantized signal samples of an image during image decompression.

As is well-known, in a variety of situations, it is desirable to have the ability to compress and decompress an image or a sequence of images. Without limitation, this may be desirable, for example, for transmission over a limited bandwidth communications channel, or for efficient storage of an image so it may later be retrieved. As is also well-known, image compression and decompression is typically computationally intensive and also employs a variety of operations in order to accomplish the end result, namely compression. For example, typically the image is transformed into another domain, such as from the spatial demain to the frequency domain, and, likewise, typically some form of quantization is employed. Likewise, to decompress, a reverse process is employed. These are just two examples of the operations that may be performed upon the signal samples of an image in order to accomplish image compression and decompression. Additional operations may include entropy encoding, etc. Typically, each of these operations are computationally intensive. Therefore, if these operations are performed in software, a relatively large amount of processing power may be employed in order to perform the compression. Likewise, if, alternatively, these operations are performed using hardware, typically, separate hardware elements may be employed to perform each operation, to pipeline the processing, for example. A need, therefore, exists to reduce the amount of computationally intensive operations or the number of separate hardware elements employed to perform image compression and decompression.

BRIEF DESCRIPTION OF DRAWINGS

The subject matter regarded as the invention is particularly pointed out and distinctly claimed in the concluding portion of the specification. The invention, however, both as to organization, and method of operation, together with objects, features, and advantages thereof, may best be understood by reference to the following detailed description when read with the accompanying drawings in which:

FIG. 2 is a schematic diagram illustrating an embodiment of a method of quantizing signal samples of an image during image compression in accordance with the invention described in the aforementioned related patent application in which a scaling operation is demonstrated;

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components, and circuits have not been described in detail so as not to obscure the present invention.

Figure 3:
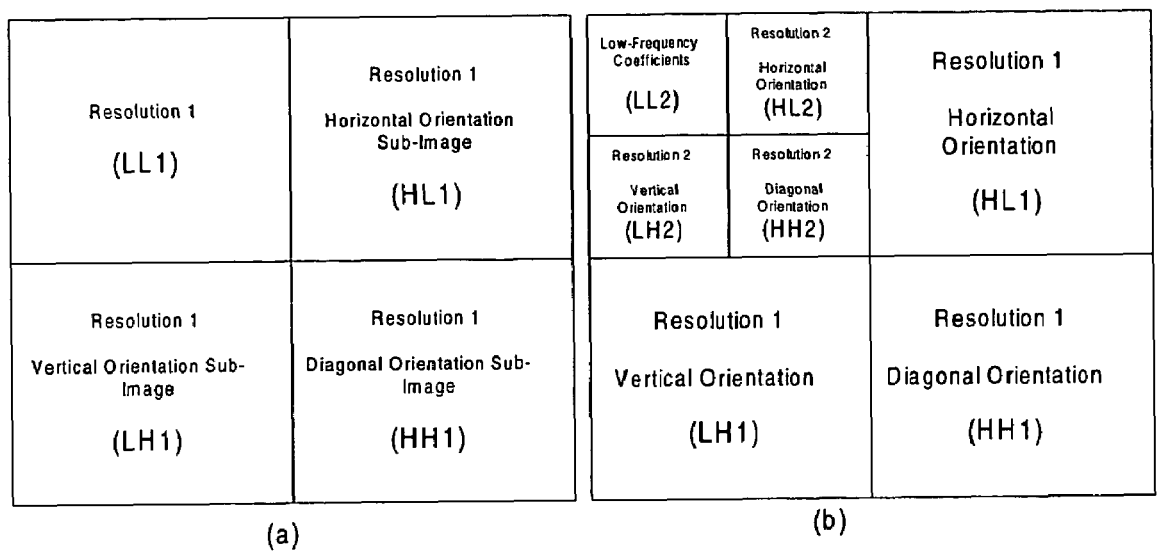
FIG. 3 is a schematic diagram illustrating results of applying a Discrete Wavelet Transform (DWT) to an image where multiple or multi-levels are produced.

As previously indicated, one operation applied to accomplish compression of an image is transformation of an image from a first domain, such as a spatial domain, to a second domain, such as a frequency domain, although, of course, the invention is not limited in scope to transforming between these two particular domains. One common transformation employed in image compression is a Discrete Wavelet Transform (DWT) and also a multi-level DWT. Again, although the invention is not limited in scope in this respect, typically, for imaging compression or decompression, a two-dimensional DWT is employed. This is illustrated in more detail in FIG. 3.

Where the DWT is applied, the original image is decomposed into four subbands, illustrated, for example, by FIG. 3($a$). For a multi-level DWT, for example, this is referred to as a level of decomposition, and a subband at this level of decomposition may be further decomposed to produce another level of decomposition, illustrated, for example, by FIG. 3($b$). In FIG. 3, the LL subband of FIG. 3($a$), such as LL1, is further decomposed as shown in FIG. 3($b$).

As illustrated, for example, by FIG. 3($a$), the subbands are divided in the horizontal and the vertical direction, in this particular example according to frequency, with one half compromising the low frequency subband and the other half comprising the high frequency subband. Therefore, four different combinations of subbands result as illustrated, referred to as LL, LH, HL, and HH subbands, where L refers to low frequency signal information and H refers to high frequency signal information. It is generally understood that most of the basic signal information of the image is present in the low frequency LL subband, such as LL1. In a multi-level DWT, as previously indicated, the LL subband may be further decomposed, and this process may be taken to several levels, if desired. In this context, we shall designate the overall total number of levels of decomposition as K.

Typically, in image compression, once the DWT has been applied to the image and the so-called "transformed coefficients" have been obtained, then the coefficients are quantized based on subband location. It is desirable in a situation such as this to employ uniform scaling or quantization, meaning, in this context, that the transformed coefficients in a particular or selected subband are quantized based upon the same or substantially the same quantization value.

Quantization is desirable in image compression because it operates as another approach to filter the more useful information of the image from the less useful information of the image based, at least in part, on selected characteristics of a human vision system. Scalar quantization is performed by dividing a coefficient in the subband by a quantization or threshold value, Q. The nearest integer obtained after rounding or truncation, depending upon the implementation, for example, is the quantized coefficient. Tradeoffs or the selection of implementation details may, of course, be made for a variety of different reasons, such as accuracy or complexity, and, the invention is not limited in scope to a particular implementation detail, such as whether rounding or truncation is employed or how it may specifically be carried out.

As previously indicated, these operations are typically performed separately and may either result in a relatively high amount of computational complexity or, alternatively, may, in some cases, employ separate pieces of circuitry to perform the separate operations. Separating these operations in this manner, therefore, may result in lower performance in terms of speed and/or greater expense in terms of the amount or size of the silicon die where, for example, the operation is implemented through circuitry on an integrated circuit. It would, therefore, be desirable, for a variety of reasons, if the number of separate operations performed during image compression could be reduced.

FIG. 2 illustrates the application of an embodiment of a method of quantizing signal samples of an image during image compression in accordance with the invention described in the aforementioned related patent application. In this particular embodiment, a process is applied to transform signal samples of the image from a first domain to a second domain such as, for example, as previously described, from the spatial domain to the frequency domain. However, in this particular embodiment, during the transformation process, signal samples are filtered by applying scaled or pre-scaled filter coefficients. Signal samples are filtered by applying scaled or pre-scaled filter coefficients along the image first in one direction such as, for example, row-wise, in this particular embodiment. This is illustrated by the left portion of FIG. 2. Therefore, in this particular embodiment, as rows of the image are decomposed into high and low frequency components, those components are also filtered by scaled or pre-scaled filter coefficients in accordance with the factors illustrated in FIG. 2, for this particular embodiment. In this embodiment, once the row-wise decomposition and filtering with scaled filter coefficients has been completed, it is then performed in a second direction, such as column-wise. Again, columns are decomposed into high and low frequency components and, likewise, the signal samples of those high and low frequency components are filtered with coefficients scaled in the manner illustrated by the right portion of FIG. 2. It will, of course, be appreciated that the invention described in the aforementioned related patent application is not limited in scope to this particular embodiment. For example, in other embodiments, alternatively decomposition and filtering with scaled or pre-scaled coefficients may be performed column-wise and then row-wise or in other alternative directions. Likewise, depending on the particular embodiment or approach, it may be that not all filter coefficients are scaled, for example. A variety of different approaches to scale the filter coefficients or portions thereof, for example, may be employed. It is noted, however, that in this particular embodiment the two directions, horizontal and vertical, or row-wise and column-wise here, are mutually orthogonal, providing some benefit in terms of implementation because the two-dimensional scaling function may be expressed as a separable function. It shall be demonstrated hereinafter, when, for this particular embodiment, a transformation process of the image is complete, selected regions of the transformed signal samples, in this particular embodiment, the respective regions LL, HL, LH, and HH, are quantized by a common value.

In this particular embodiment, although the invention is not limited in scope in this respect, decomposition of an arbitrary sequence $x=\{x_0, x_1, \ldots, x_{N-1}\}$ into a low pass subband $a=\{a_0, a_1, \ldots, a_{(N/2)-1}\}$ and a high pass subband $c=\{c_0, c_1, \ldots, c_{(N/2)-1}\}$ using 9-7 biorthogonal spline filters, for example, may be represented as follows:

$$a_n = \sum_{i=0}^{8} l_i \cdot x_{2n-i} \quad [1]$$

$$c_n = \sum_{i=0}^{6} h_i \cdot x_{2n-i} \quad [2]$$

where $I=\{I_0, I_1, \ldots, I_8\}$ and $h=\{h_0, h_1, \ldots, h_6\}$ are, respectively, the 9-tap low pass and the 7-tap high pass filter coefficients.

This is one technique for employing a two-dimensional DWT, although other approaches of implementing a two-dimensional DWT may be employed. For example, one may apply any 2-D filter as long as the filter may be decomposed into two 1-D filters. The expressions for the scaling factors remain the same. Likewise, a simple approach in this embodiment is to perform the decomposition row-wise and then column-wise, as previously described, although the invention is not limited in scope in this respect. As previously indicated, this is possible because, for this embodiment, the two-dimensional scaling function may be expressed as a separable function, that is, in this embodiment, the product of two one dimensional scaling functions.

It is likewise noted that, depending upon the particular embodiment, this method may be applied on multi-levels. For a K level two-dimensional DWT pyramid, where K is a positive integer, the filtering in the $k^{th}$ level may be performed in the following manner:

First, at each level of DWT, set $Q(LL_k)=1$ when level k is less than K.

Row-Wise, One-Dimensional DWT

For low pass filtering over the $LL_{k-1}$ subband or the input image when k=1, each filter coefficient, $I_i$, is scaled by the factor:

$$\frac{1}{\sqrt{Q(LL_k)}}$$

For high pass filtering over the $LL_{k-1}$ subband or the input image when k=1, each filter coefficient, $h_i$, is scaled by the factor:

$$\frac{\sqrt{Q(LL_k)}}{Q(HL_k)}$$

Column-Wise One-Dimensional DWT

For low pass filtering to generate subbands, $LL_k$ and $HL_k$, each weight of the filter, $I_i$, is scaled by the factor:

$$\frac{1}{\sqrt{Q(LL_k)}}$$

For high pass filtering to generate subband $LH_k$, each weight of the filter, $h_i$, is scaled by the factor:

$$\frac{\sqrt{Q(LL_k)}}{Q(LH_k)}$$

For high pass filtering to generate subband $HH_k$, each weight of the filter $h_i$, is scaled by the factor:

$$\frac{Q(HL_k)}{Q(HH_k)\sqrt{Q(LL_k)}}$$

where Q ($HL_k$), Q ($HH_k$), Q ($LH_k$), and Q ($LL_k$) are the quantization thresholds of the subbands, HL, HH, LH, and LL in the $k^{th}$ level, respectively. FIG. 2 shows the corresponding scaling factors in terms of these subband locations, as previously described, where, for example, $Q(LL_k)$ for the $k^{th}$ level is designated as Q_LL.

After mathematical manipulation, it may be demonstrated that after the row-wise and column-wise filtering of the four subbands at any level, the following scaling factors result:
LL subband at level k:

$$\frac{1}{\sqrt{Q(LL_k)}}\frac{1}{\sqrt{Q(LL_k)}} = \frac{1}{Q(LL_k)}$$

when k=K, or 1 when k<K;
HL subband at level k $$\frac{\sqrt{Q(LL_k)}}{Q(HL_k)}\frac{1}{\sqrt{Q(LL_k)}} = \frac{1}{Q(HL_k)};$$

LH subband at level k:

$$\frac{1}{\sqrt{Q(LL_k)}}\frac{\sqrt{Q(LL_k)}}{Q(LH_k)} = \frac{1}{Q(LH_k)};$$

HH subband at level k:

$$\frac{\sqrt{Q(LL_k)}}{Q(HL_k)}\frac{Q(HL_k)}{Q(HH_k)\sqrt{Q(LL_k)}} = \frac{1}{Q(HH_k)}.$$

Figure 1:
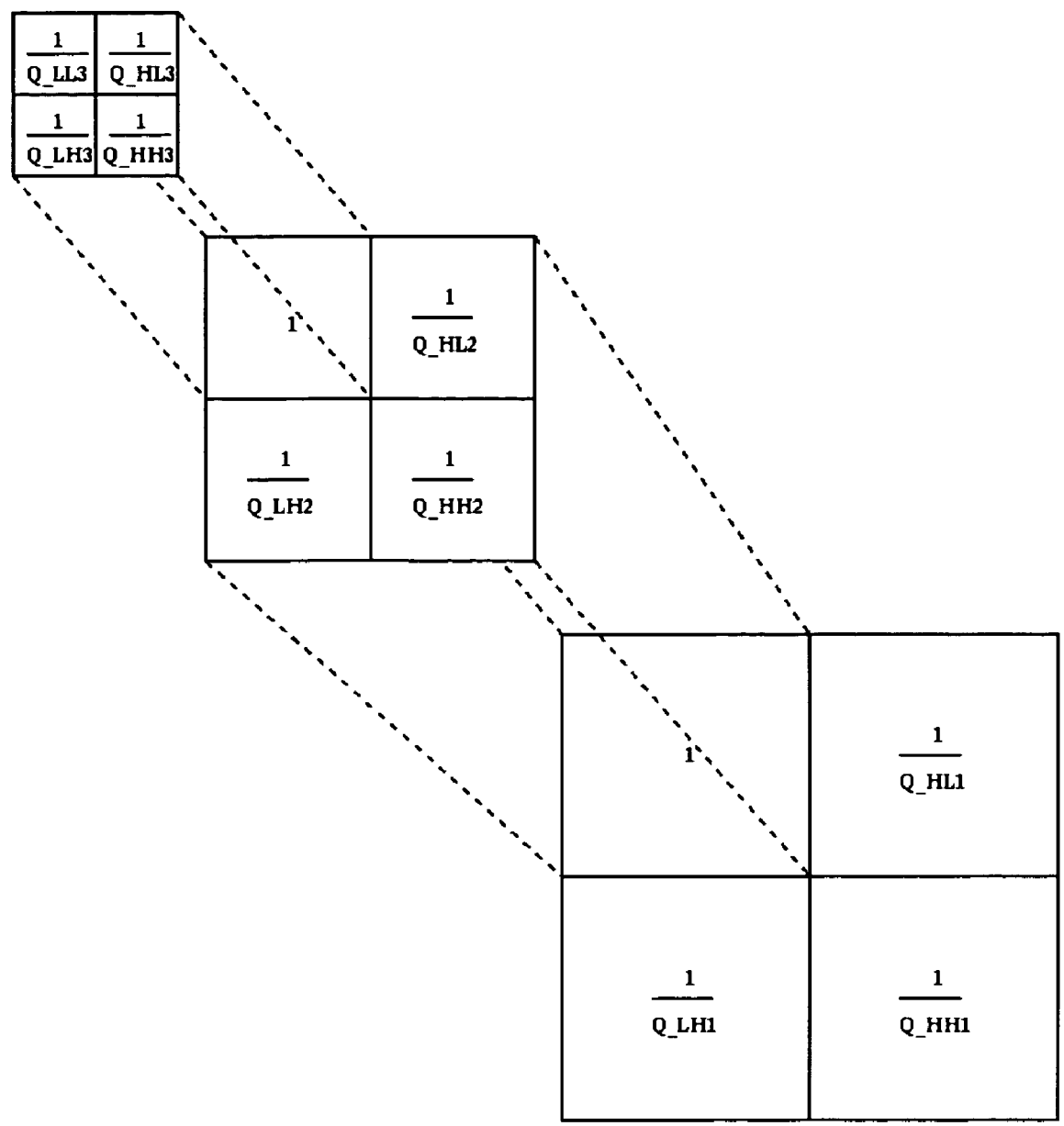
FIG. 1 is a diagram schematically illustrating a process of applying an embodiment of a method for quantizing signal samples of an image during image compression in accordance with the invention described in the aforementioned related patent application.

Therefore, the desired scaling or quantization in designated or selected regions has been accomplished. FIG. 1 is an example illustrating a process where this embodiment is applied for K=3.

As previously demonstrated, for this particular embodiment of a method of quantizing signal samples of an image during image compression, uniform scaling or quantization has been integrated into a multi-level DWT transformation. As a result, quantization circuitry may be eliminated. This may, therefore, result in a smaller silicon die for an integrated circuit, potentially reducing cost and improving speed. A similar approach may be applied for a software implementation in order to reduce computational "costs" and achieve faster execution of a DWT based image compression technique, for example.

Figure 5:
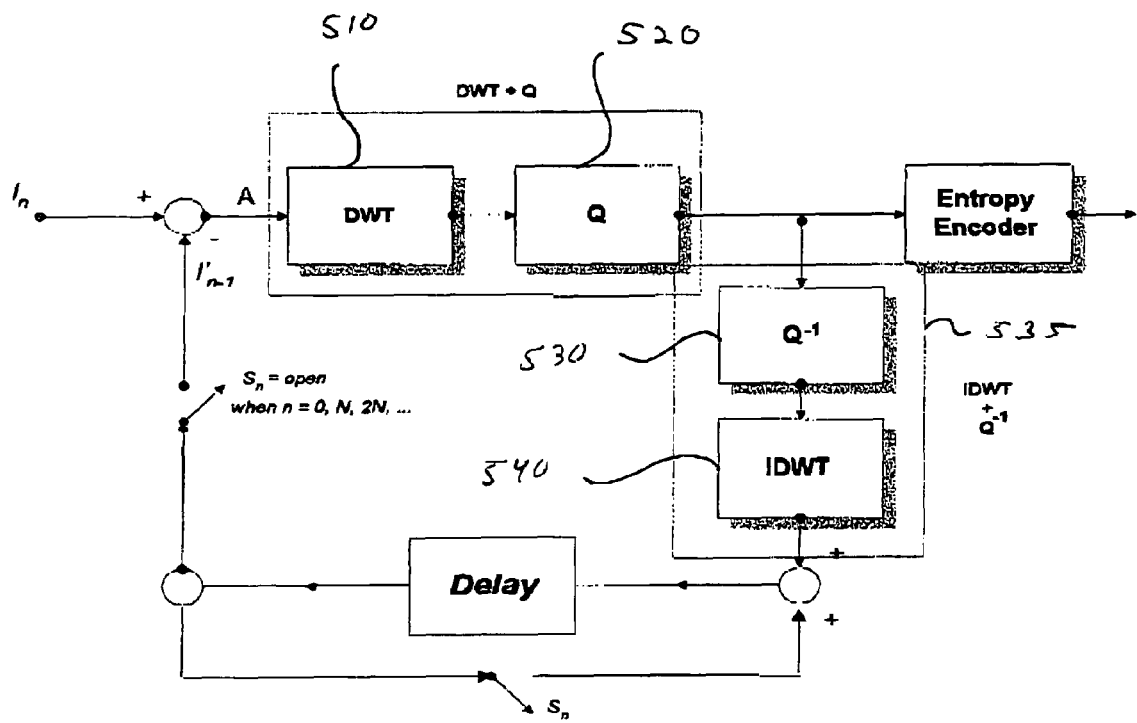
FIG. 5 is a block diagram illustrating a typical frame difference process employing a feedback loop in order to perform video compression.

FIG. 5 is a block diagram illustrating a typical frame difference process with a feedback loop in order to perform video compression. As illustrated by the block diagram in the forward path, a DWT operation and a quantization operation are respectively applied by blocks 510 and 520. This corresponds to the approach normally taken to perform compression, as previously described. Therefore, a method of quantizing signal samples of an image during image compression in accordance with the invention described in the aforementioned related patent application, as previously described, may be employed. Nonetheless, FIG. 5 further illustrates the application of an inverse quantization operation 530 and an inverse DWT 540 (IDWT). It would be desirable to have the ability to combine both the inverse quantization operation and the inverse DWT operation, such as the one provided in the feedback loop illustrated by 535 for the inverse DWT and inverse quantization operations, for example. In addition to the advantages previously described of applying the previously described embodiment to the forward loop in place of 510 and 520 by combining them, advantages are also gained by similarly combining 530 and 540. This would further simplify and reduce the size of the circuit implementing the compression operation illustrated by FIG. 5 and, likewise, where the implementation is performed in software, a reduction in computation time may result.

In this particular embodiment of a method of inverse quantizing quantized signal samples of an image during image decompression in accordance with the present invention, a process to transform the quantized signal samples from the first domain, such as the frequency domain, to a second domain, such as the spatial domain is applied. During the transformation process, quantized signal samples are filtered by applying scaled or pre-scaled filter coefficients, in this particular embodiment. The signal samples are first filter along the image in a first direction by applying scaled or pre-scaled filter coefficients, such as column-wise, and then the signal samples are filtered along the image in a second direction such as row-wise, by applying scaled or pre-scaled filter coefficients, so that at the completion of the transformation process of the image, the transformed signal samples are inverse quantized. It is noted, as with the previously described embodiment of a method of quantizing signal samples of an image during image compression, the first direction and second direction are mutually orthogonal, in this embodiment. Likewise, although the invention is not limited in scope in this respect, the transformation process may comprise the inverse DWT. Furthermore, the invention is not restricted in scope to a particular direction along the image that is filtered or to a particular order in which these directions are filterd by applying scaled coefficients. For example, alternatively, in another embodiment, it may be possible to filter signal samples with scaled coefficients first row-wise and then column-wise.

The following embodiment is described in terms of a two-dimensional inverse DWT, although, again, the invention is not limited in scope in this respect. Likewise, this particular embodiment may be applied to a K level pyramid there K is a positive integer, although, again, the invention is not limited in the scope to being applied to more than one level, or to a particular number of levels. Nonetheless, for this embodiment, inverse filtering the $k^{th}$ level may be performed in the following manner.

First, at a level of the transformation process, in this particular embodiment, an IDWT process is applied, and Q $(LL_k)=1$ when k is less than K. As previously discussed, as the transformation process is applied, transformed signal samples filtered along the image in a first direction, such as column-wise, by applying scaled filter coefficients. Therefore, where, for this particular embodiment, an IDWT is being employed, scaling of the filter coefficients is performed as follows:

For inverse low pass filtering over the DWT coefficients at level k, subbands $LL_k$ and $HL_k$, filter coefficients are scaled by the factor $\sqrt{Q(LL_k)}$.

Next, for inverse high pass filtering over the DWT coefficients at level k, subband $LH_k$, filter coefficients are scaled by the factor $$\frac{Q(LH_k)}{\sqrt{Q(LL_k)}}.$$

Then, for inverse high pass filtering over the DWT coefficients at level k, subband $HH_k$, filter coefficients are scaled by the factor $$\frac{Q(HH_k)\sqrt{Q(LL_k)}}{Q(HL_k)}.$$

As previously described, after filtering is performed along the image in the first direction, then filtering is performed along the image in a second direction, in this particular embodiment row-wise, as follows:

For inverse low pass filtering over the DWT coefficients at level k, subbands $LL_k$ and $LH_k$, filter coefficients are scaled by the factor $\sqrt{Q(LL_k)}$.

For inverse high pass filtering over the DWT coefficients at level k, subband $HL_k$ and $HH_k$, filter coefficients are scaled by the factor $$\frac{Q(HL_k)}{\sqrt{Q(LL_k)}},$$

where Q $(LH_k)$, Q $(HH_k)$, Q $(LH_k)$ and Q $(LL_k)$ are the quantization thresholds for the subbands HL, HH, LH, and LL in the $k^{th}$ level, respectively.

Figure 6:
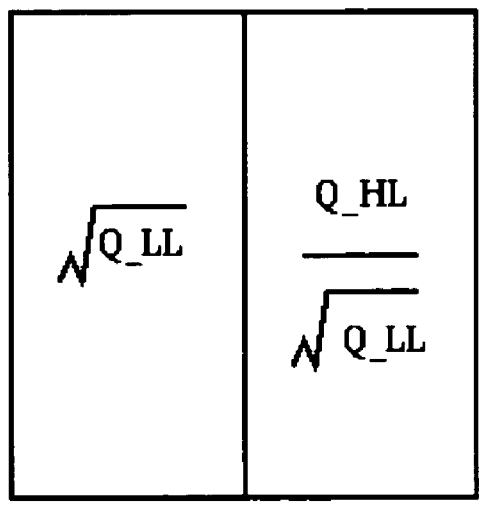
FIG. 6 is a schematic diagram illustrating an embodiment of a method of inverse quantizing quantized signal samples of an image during image decompression in accordance with the invention.
Figure 6:
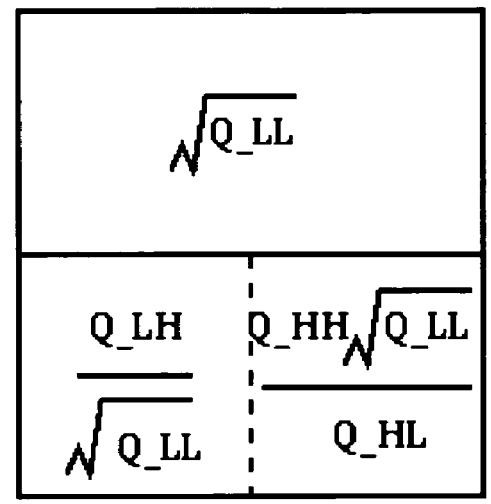

FIG. 6 shows corresponding scale factors for filter coefficients in terms of subband locations. It is noted that these are the multiplicative inverses of the scale factors applied to filter coefficients in the particular embodiment of the invention described in the aforementioned related patent application. It may be demonstrated by mathematical manipulation that after the column-wise and row-wise inverse filtering of the DWT coefficients at any level, scaling by the following factors occurs.

LL sub-band at level k: $\sqrt{Q(LL_k)}\sqrt{Q(LL_k)}=Q(LL_k)$ when k=K, or 1 when k<K;

HL sub-band at level k:

$$\sqrt{Q(LL_k)}\frac{Q(HL_k)}{\sqrt{Q(LL_k)}}=Q(HL_k);$$

LH sub-band at level k:

$$\frac{Q(LH_k)}{\sqrt{Q(LL_k)}}\sqrt{Q(LL_k)}=Q(LH_k);$$

HH sub-band at level k:

$$\frac{Q(HH_k)\sqrt{Q(LL_k)}}{Q(HL_k)}\frac{Q(HL_k)}{\sqrt{Q(LL_k)}}=Q(HH_k).$$

Figure 4:
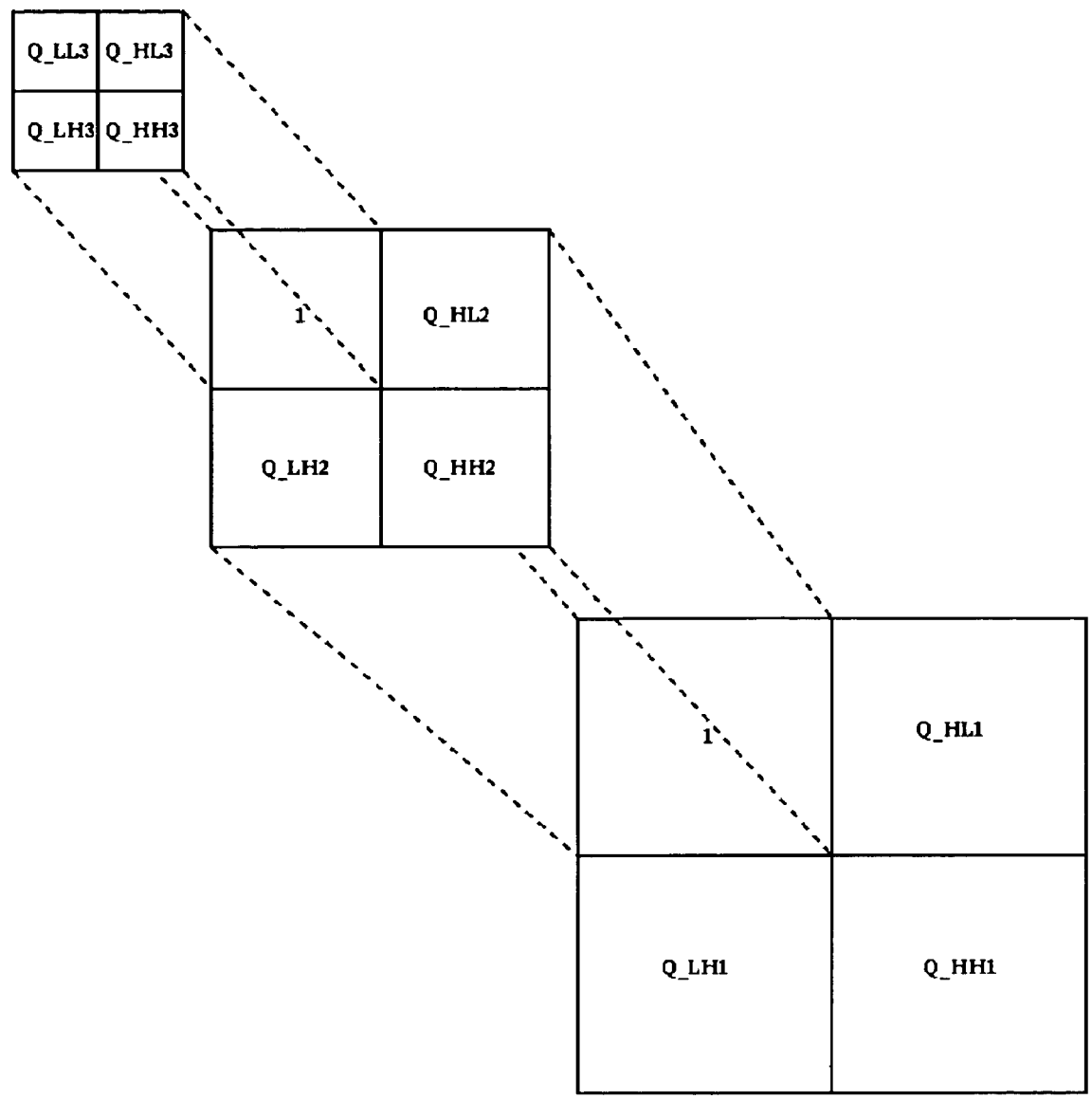
FIG. 4 is a schematic diagram illustrating results of applying an Inverse Discrete Wavelet Transform (IDWT) to an image where multiple or multi-levels are produced.

FIG. 4 shows an example with K=3. Again, it is noted that this example shows multilevel inverses of previously discussed scale factors. Hence, for this embodiment, the desired inverse uniform scale quantization has resulted. As previously described, as a result, the inverse quantization circuitry may be eliminated, potentially resulting in a smaller silicon die for large scale integration (LSI) implementation and potentially an improvement in speed performance. Likewise, implementation in software may reduce the computation cost and faster execution of the DWT based image compression/decompression technique.

As previously indicated, it will be appreciated that many different embodiments are within the scope of the present invention. For example, although a method of inverse quantizing quantized signal samples of an image during image decompression in accordance with the present invention is described, alternatively, an embodiment may comprise, for example, a device, such as, for example, an integrated circuit. In such an embodiment, the integrated circuit may, for example, include input ports to receive signal samples associated with at least one image and the integrated circuit may include digital circuitry, although, of course, the invention is not limited in scope in this respect. The digital circuitry may have a configuration to apply a process to transform the signal samples from a first domain to a second domain and, during the transform process, filter signal samples, by first applying scaled filter coefficients to signal samples along the image in a first direction and then applying scaled filter coefficients to signal samples along the image in a second direction, so that, at the completion of the transform process of the image, at least selected regions of the transformed signal samples are inverse quantized. Likewise, other aspects of the previously described embodiment, for example, may be included, although, again, the invention is not limited in scope in this respect. Additionally, features not previously described may be included in an embodiment in accordance with the invention.

Likewise, yet another an alternative embodiment may comprise an article, such as a storage medium, having stored thereon, instructions, that, when executed by a system to execute such instructions, for example, may result in the previously described method embodiment being performed. For example, although the invention is not limited in scope in this respect, the system may comprise a computer, such as a personal computer, a set-top box, a server, or anyone of a number of other systems that may be adapted to execute specific instructions stored on a storage medium.

While certain features of the invention have been illustrated and described herein, many modifications, substitutions, changes and equivalents will now occur to those skilled in the art. It is, therefore, to be understood that the appended claims are intended to cover all such modifications and changes as fall within the true spirit of the invention.

What is claimed is:

1. A method of inverse quantizing quantized signal samples of an image during image decompression comprising:
    applying a process to transform the quantized signal samples from a first domain to a second domain, the transform process comprises an inverse discrete wavelet transform (IDWT) to decompose signal samples into two or more subbands; and
    during the transform process, filtering quantized signal samples by applying scaled filter coefficients, the signals samples first being filtered along the image in a first direction and then along the image in a second direction, so that at the completion of the transform process of the image, at least a selected portion of the transformed signal samples are inverse quantized, wherein the inverse quantization is integrated into the IDWT process, wherein scaling in a first mutually orthogonal direction comprises:
    applying a first scale factor to each filter coefficient in the low pass filtering operation to subbands $LL_k$ and $HL_k$;
    applying a second scale factor to each filter coefficient in the high pass filtering operation to subband $LH_k$; and
    applying a third scale factor to each filter coefficient in the high pass filtering operation to subband $HH_k$;
    HL, HH, LH, and LL in the $k^{th}$ level, respectively.

2. The method of claim 1, wherein the first direction and the second direction are mutually orthogonal.

3. The method of claim 1, wherein the first domain is the frequency domain, the second domain is the spatial domain, the first direction is one of row-wise and column-wise, and the second direction is the other of row-wise and column-wise.

4. The method of claim 3, wherein the IDWT comprises a two-dimensional IDWT.

5. The method of claim 4, wherein the inverse transform process comprises combining low pass and a high pass subbands.

6. The method of claim 4, wherein the subbands being combined were decomposed by biorthogonal spline filters.

7. The method of claim 6, wherein the spline filters were 9-7 biorthogonal spline filters.

8. The method of claim 4, and further comprising applying another level of filtering and scaling to the LL subband of the transformed image.

9. The method of claim 4, and further comprising applying a kth level of filtering and scaling by successively applying, k–1 times, filtering and scaling to the LL subband of the transformed image, k being a positive integer.

10. The method of claim 3, wherein scaling in a first mutually orthogonal direction comprises:
    applying the first scale factor $\sqrt{Q(LL_k)}$ to each filter coefficient in the low pass filtering operation to subbands $LL_k$ and $HL_k$;
    applying the second scale factor $$\frac{Q(LH_k)}{\sqrt{Q(LL_k)}}$$

to each filter coefficient in the high pass filtering operation to subband $LH_k$; and
    applying the third scale factor $$\frac{Q(HH_k)\sqrt{Q(LL_k)}}{Q(HL_k)}$$

to each filter coefficient in the high pass filtering operation to subband $HH_k$;
    Q ($HL_k$), Q ($HH_k$), Q ($LH_k$), and Q ($LL_k$) being the quantization thresholds of the subbands, HL, HH, LH, and LL in the $k^{th}$ level, respectively, and Q ($LL_k$) being equal to 1, when level k is less than K.

11. The method of claim 10, wherein scaling in a second direction comprises:
    applying the first scale factor $\sqrt{Q(LL_k)}$ to each filter coefficient in the low pass filtering operation over the $LL_k$ and $LH_k$ subband; and
    applying the second scale factor $$\frac{Q(HL_k)}{\sqrt{Q(LL_k)}},$$

to each filter coefficient in the high pass filtering operation over the $HL_k$ and $HH_k$ subband;
    Q ($HL_k$) and Q ($LL_k$) being the quantization thresholds of the subbands, HL and LL in the $k^{th}$ level, respectively, K being the total level of the DWT, k being a positive integer less than or equal to K, Q ($LL_k$) being 1 when k is less than K, and $LL_1$ being the input image.

12. The method of claim 3, wherein the IDWT comprises a multidimensional IDWT.

13. The method of claim 3, wherein the method of inverse quantization is applied to successive video image frames.

14. The method of claim 3, wherein the signal samples are inverse quantized by truncating the signal sample values.

15. The method of claim 3, wherein the signal samples are inverse quantized by rounding the signal sample values.

16. The method of claim 1, wherein the at least a selected portion of the transformed signal samples comprises an entire image of transformed signal samples.

17. A device comprising:
    an integrated circuit;
    said integrated circuit having input ports to receive signal samples associated with at least one image;
    said integrated circuit including digital circuitry;
    said digital circuitry having a configuration to apply a process to transform the signal samples from a first domain to a second domain and during the transform process, filtering signal samples, by first applying scaled filter coefficients to signal samples along the image in a first direction and then applying scaled filter coefficients to signal samples along the image in a second direction, at least a selected portion of the transformed signal samples are inverse quantized, the transform process comprises an inverse discrete wavelet transform (IDWT) to decompose signal samples into two or more subbands, wherein the inverse quantization is integrated into the IDWT process, wherein scaling in a first mutually orthogonal direction comprises:

applying a first scale factor to each filter coefficient in the low pass filtering operation to subbands $LL_k$ and $HL_k$;

applying a second scale factor to each filter coefficient in the high pass filtering operation to subband $LH_k$; and applying a third scale factor to each filter coefficient in the high pass filtering operation to subband $HH_k$;

HL, HH, LH, and LL in the $k^{th}$ level, respectively.

18. The device of claim 17, wherein the first direction and the second direction are mutually orthogonal.

19. The device of claim 17, wherein the first domain is the frequency domain, the second domain is the spatial domain, the first direction is one of row-wise and column-wise, and the second direction is the other of row-wise and column-wise.

20. The device of claim 19, wherein the IDWT comprises a two-dimensional IDWT.

21. The device of claim 20, wherein the transform process comprises combining low pass and a high pass subbands.

22. The device of claim 19, and further comprising applying a second level of filtering and scaling to the LL subband of the transformed image.

23. The device of claim 19, and further comprising applying a kth level of filtering and scaling by successively applying, k−1 times, filtering and scaling to the LL subband of the transformed image, k being a positive integer.

24. An article comprising: a storage medium, said storage medium having stored thereon, instructions, that when executed by a system to execute said instructions, results in:

applying a process to transform signal samples associated with at least one image from a first domain to a second domain, the transform process comprises an inverse discrete wavelet transform (IDWT) to decompose signal samples into two or more subbands; and during the transform process, filtering signal samples, by first applying scaled filter coefficients to signal samples along the image in a first direction and then applying scaled filter coefficients to signal samples along the image in a second direction, so that at the completion of the transform process of the image, at least a selected portion of the transformed signal samples are inverse quantized, wherein the inverse quantization is integrated into the IDWT process, wherein scaling in a first mutually orthogonal direction comprises:

applying a first scale factor to each filter coefficient in the low pass filtering operation to subbands $LL_k$ and $HL_k$;

applying a second scale factor to each filter coefficient in the high pass filtering operation to subband $LH_k$; and applying a third scale factor to each filter coefficient in the high pass filtering operation to subband $HH_k$;

HL, HH, LH, and LL in the $k^{th}$ level, respectively.

25. The article of claim 24, wherein the first domain is the frequency domain, the second domain is the spatial domain, the first direction is one of row-wise and column-wise, and the second direction is the other of row-wise and column-wise.

26. The article of claim 25, wherein the IDWT comprises a two-dimensional IDWT.

27. The article of claim 24, wherein the transform process comprises combining low pass and a high pass subbands.

28. The article of claim 25, and further comprising applying a second level of transformation and scaling to the LL subband of the transformed image.

29. The article of claim 25, and further comprising applying a kth level of filtering and scaling by successively applying, k−1 times, filtering and scaling to the LL subband of the transformed image, k being a positive integer.

30. A method of inverse quantizing quantized signal samples of an image during image decompression comprising:

applying a process to transform the quantized signal samples from a first domain to a second domain; and during the transform process, filtering quantized signal samples by applying scaled filter coefficients, the signals samples first being filtered along the image in a first direction and then along the image in a second direction, so that at the completion of the transform process, of the image, at least a selected portion of the transformed signal samples are inverse quantized, scaling in a first mutually orthogonal direction comprises:

applying the scale factor $\sqrt{Q(LL_k)}$ to each filter coefficient in the low pass filtering operation to subbands $LL_k$ and $HL_k$;

applying the scale factor $$\frac{Q(LH_k)}{\sqrt{Q(LL_k)}}$$

to each filter coefficient in the high pass filtering operation to subband $LH_k$; and applying the scale factor $$\frac{Q(HH_k)\sqrt{Q(LL_k)}}{Q(HL_k)}$$

to each filter coefficient in the high pass filtering operation to subband $HH_k$;

$Q(HL_k)$, $Q(HH_k)$, $Q(LH_k)$, and $Q(LL_k)$ being the quantization thresholds of the subbands, HL, HH, LH, and LL in the $k^{th}$ level, respectively, and $Q(LL_k)$ being equal to 1, when level k is less than K.

31. A method of inverse quantizing quantized signal samples of an image during image decompression comprising:

applying a process to transform the quantized signal samples from a first domain to a second domain; and during the transform process, filtering quantized signal samples by applying scaled filter coefficients, the signals samples first being filtered along the image in a first direction and then along the image in a second direction, so that at the completion of the transform process, of the image, at least a selected portion of the transformed signal samples are inverse quantized, scaling in a second direction comprises:

applying the scale factor $\sqrt{Q(LL_k)}$ to each filter coefficient in the low pass filtering operation over the $LL_k$ and $LH_k$ subband; and applying the scale factor $$\frac{Q(HL_k)}{\sqrt{Q(LL_k)}},$$

to each filter coefficient in the high pass filtering operation over the $HL_k$ and $HH_k$ subband;

$Q(HL_k)$ and $Q(LL_k)$ being the quantization thresholds of the subbands, HL and LL in the $k^{th}$ level, respectively, K being the total level of the DWT, k being a positive integer less than or equal to K, $Q(LL_k)$ being 1 when k is less than K, and $LL_1$ being the input image.

* * * * *